(12) United States Patent
Jiang et al.

(10) Patent No.: US 12,506,924 B2
(45) Date of Patent: Dec. 23, 2025

(54) DISPLAY CONTROL METHOD AND APPARATUS, AND DEVICE AND STORAGE MEDIUM

(71) Applicant: BEIJING ZITIAO NETWORK TECHNOLOGY CO., LTD., Beijing (CN)

(72) Inventors: Haiqiang Jiang, Beijing (CN); Qi Wang, Beijing (CN); Shuo Wang, Beijing (CN); Yao Guo, Beijing (CN); Lei Wang, Beijing (CN); Liyue Ji, Beijing (CN); Zifeng Zhao, Beijing (CN)

(73) Assignee: Beijing Zitiao Network Technology Co., Ltd.

( * ) Notice: Subject to any disclaimer, the term of this patent is extended or adjusted under 35 U.S.C. 154(b) by 0 days.

(21) Appl. No.: 18/578,080

(22) PCT Filed: Sep. 21, 2022

(86) PCT No.: PCT/CN2022/120057
§ 371 (c)(1),
(2) Date: Jan. 10, 2024

(87) PCT Pub. No.: WO2023/051330
PCT Pub. Date: Apr. 6, 2023

(65) Prior Publication Data
US 2024/0267586 A1 Aug. 8, 2024

(30) Foreign Application Priority Data

Sep. 30, 2021 (CN) .......................... 202111165246.0

(51) Int. Cl.
*H04N 21/431* (2011.01)
*G06F 3/14* (2006.01)
*H04N 21/45* (2011.01)

(52) U.S. Cl.
CPC ........... *H04N 21/4316* (2013.01); *G06F 3/14* (2013.01); *H04N 21/4532* (2013.01)

(58) Field of Classification Search
None
See application file for complete search history.

(56) References Cited

U.S. PATENT DOCUMENTS 6,177,931 B1 * 1/2001 Alexander ....... H04N 21/42204
348/E7.071
7,263,711 B1 * 8/2007 Estipona ................ H04N 7/163
348/E7.071

(Continued)

FOREIGN PATENT DOCUMENTS

CN     101047836     10/2007
CN     106484240 A     3/2017

(Continued)

OTHER PUBLICATIONS

International Search Report issued in PCT/CN2022/120057, dated Nov. 29, 2022, with English translation.

(Continued)

*Primary Examiner* — An Son P Huynh
(74) *Attorney, Agent, or Firm* — Fish & Richardson P.C.

(57) ABSTRACT

Disclosed in the embodiments of the present disclosure are a display control method and apparatus, and a device and a storage medium. The method includes: plays a first video in a first display area in a video stream playing interface of a preset application program. The method further receives a switching instruction. When a preset reminding condition is met, the method switches to play a second video in the first display area. The display area for the second video is changed from the first display area to a second display area during the playing process, and the size of the second display area is smaller than the size of the first display area.

(Continued)

In addition, the method displays preset prompt information outside the second display area in the video stream playing interface.

15 Claims, 5 Drawing Sheets

(56) References Cited

U.S. PATENT DOCUMENTS

| | | | | |
|---|---|---|---|---|
| 8,196,173 | B2* | 6/2012 | Sawada | H04N 21/8455 725/31 |
| 9,967,612 | B2* | 5/2018 | Greene | H04N 21/45 |
| 9,973,806 | B2* | 5/2018 | Tsiridis | H04N 21/8153 |
| 9,980,002 | B2* | 5/2018 | Yan | H04N 21/4882 |
| 10,114,689 | B1* | 10/2018 | Yang | G06F 11/0751 |
| 10,397,640 | B2* | 8/2019 | Cormican | H04N 21/47205 |
| 10,419,817 | B2* | 9/2019 | Fishman | H04N 21/4668 |
| 11,601,721 | B2* | 3/2023 | Bloch | H04N 21/8541 |
| 2006/0126919 | A1* | 6/2006 | Kitaura | H04N 13/189 348/E13.067 |
| 2007/0103558 | A1* | 5/2007 | Cai | H04N 21/21805 348/E5.022 |
| 2009/0013363 | A1* | 1/2009 | Lee | H04H 60/12 725/110 |
| 2009/0142041 | A1* | 6/2009 | Nagasawa | H04N 19/44 348/42 |
| 2010/0083137 | A1* | 4/2010 | Shin | H04N 7/147 726/28 |
| 2010/0272417 | A1* | 10/2010 | Nagasawa | H04N 13/183 386/239 |
| 2011/0126246 | A1* | 5/2011 | Thomas | H04L 67/06 725/93 |
| 2011/0145856 | A1* | 6/2011 | Agarwal | H04N 21/25435 725/32 |
| 2011/0249074 | A1* | 10/2011 | Cranfill | G06F 9/451 348/E7.083 |
| 2012/0099795 | A1* | 4/2012 | Jojic | H04N 21/812 382/199 |
| 2013/0060926 | A1* | 3/2013 | Kato | H04L 65/80 709/223 |
| 2013/0076872 | A1* | 3/2013 | Wang | H04N 13/128 348/51 |
| 2013/0141536 | A1* | 6/2013 | Choe | H04N 21/47 348/43 |
| 2013/0169543 | A1* | 7/2013 | Xia | H04N 13/356 345/169 |
| 2013/0332173 | A1 | 12/2013 | Callahan et al. | |
| 2014/0016908 | A1* | 1/2014 | Sakaniwa | H04N 13/332 386/230 |
| 2014/0033237 | A1* | 1/2014 | Du | H04N 21/485 725/5 |
| 2014/0068692 | A1* | 3/2014 | Archibong | H04N 21/6334 725/116 |
| 2014/0082666 | A1* | 3/2014 | Bloch | G06F 3/04842 725/37 |
| 2014/0331242 | A1* | 11/2014 | De La Garza | H04N 21/44218 725/12 |
| 2014/0368734 | A1 | 12/2014 | Hoffert et al. | |
| 2015/0181301 | A1* | 6/2015 | Bloch | H04N 21/4532 725/41 |
| 2016/0066040 | A1* | 3/2016 | Webster | H04N 21/44222 725/34 |
| 2016/0094875 | A1* | 3/2016 | Peterson | H04N 21/4312 725/41 |
| 2016/0150278 | A1* | 5/2016 | Greene | H04N 21/4542 725/28 |
| 2017/0256122 | A1* | 9/2017 | Takeda | G07F 17/3227 |
| 2017/0256131 | A1* | 9/2017 | Takeda | G07F 17/3237 |
| 2017/0366867 | A1* | 12/2017 | Davies | H04N 21/8146 |
| 2017/0372679 | A1* | 12/2017 | Ye | G06F 3/147 |
| 2018/0129871 | A1* | 5/2018 | Song | H04N 21/42203 |
| 2018/0332178 | A1 | 11/2018 | Ni et al. | |
| 2019/0191203 | A1* | 6/2019 | Asbun | H04N 21/4316 |
| 2019/0208277 | A1* | 7/2019 | Lewis | H04N 21/4333 |
| 2019/0261027 | A1* | 8/2019 | Hawke | H04N 21/23424 |
| 2019/0373330 | A1* | 12/2019 | Bloch | H04N 21/4532 |
| 2020/0389700 | A1* | 12/2020 | Kaneko | G06F 3/013 |
| 2020/0396497 | A1* | 12/2020 | Liu | H04N 21/4826 |
| 2021/0127171 | A1 | 4/2021 | Liu et al. | |
| 2021/0258644 | A1* | 8/2021 | Wang | H04N 21/4826 |
| 2021/0297718 | A1* | 9/2021 | Chundi | H04N 21/4758 |
| 2021/0314654 | A1* | 10/2021 | Golyshko | H04N 21/84 |
| 2022/0321972 | A1* | 10/2022 | Chandrashekar | H04N 21/472 |
| 2023/0038036 | A1* | 2/2023 | Choi | G06F 9/452 |

FOREIGN PATENT DOCUMENTS

| | | | |
|---|---|---|---|
| CN | 106534977 A | 3/2017 | |
| CN | 106550275 A | 3/2017 | |
| CN | 106686394 A | 5/2017 | |
| CN | 107959886 A | 4/2018 | |
| CN | 108156527 A | 6/2018 | |
| CN | 109462770 A | 3/2019 | |
| CN | 109769145 A | 5/2019 | |
| CN | 112631496 A | 4/2021 | |
| CN | 112738633 A | 4/2021 | |
| CN | 113259699 | 8/2021 | |
| CN | 113923499 A | 1/2022 | |
| WO | WO 2017208378 | 12/2017 | |
| WO | WO 2019099275 | 5/2019 | |
| WO | WO 2019217086 | 11/2019 | |
| WO | WO-2022105417 A1 * | 5/2022 | G10L 15/22 |

OTHER PUBLICATIONS

Written Opinion issued in PCT/CN2022/120057, dated Nov. 29, 2022, with English translation.
Office Action issued in Chinese Application No. 202111165246.0, dated Mar. 13, 2023, with English translation.
Office Action for Brazilian Application No. 112024000755-3, mailed Nov. 19, 2024, 13 pages.
Decision to Grant a Patent for Japanese Application No. 2024-502492, mailed Nov. 26, 2024, 5 Pages.
Office Action in Japanese Appln. No. 2024-502492, dated Aug. 13, 2024, 4 pages (with English translation).
Extended European Search Report in European Appln No. 22874717.6, dated Jul. 2, 2024, 11 pages.

* cited by examiner

DISPLAY CONTROL METHOD AND APPARATUS, AND DEVICE AND STORAGE MEDIUM

This application is a U.S. National Stage under 35 U.S.C. § 371 of International Application No. PCT/CN2022/120057, as filed on Sep. 21, 2022, which claims the priority to the Chinese Patent Application No. 202111165246.0 entitled "DISPLAY CONTROL METHOD AND APPARATUS, AND DEVICE AND STORAGE MEDIUM" and filed with the Chinese Patent Office on Sep. 30, 2021. The disclosure of each of these applications is incorporated by reference into the present disclosure in its entirety.

TECHNICAL FIELD

Embodiments of the present disclosure relate to the field of computer technology, for example, a display control method and apparatus, a device, and a storage medium.

BACKGROUND

With the rapid development of information technology and the popularization of Mobile Internet, applications can provide users with more and more network information, wherein the information recommendation function of the applications is favored by more and more users.

The applications usually recommend various video contents to a user in a manner of pushing an information stream, the videos in the information stream can be switched automatically or under the operation of the user, and the video contents in the information stream are usually rich and huge in quantity, so that a phenomenon that the user is addicted to watching the video stream easily occurs, and it is needed to remind the user; however, displaying a text prompt and other manners are common in related art, which are poor in reminding effect and need to be improved.

SUMMARY

The embodiments of the present disclosure provide a display control method and apparatus, a storage medium, and a device, capable of strengthening the user's perception of anti-addiction, so that the reminding effect can be enhanced, to solve the problem that the user is easily addicted to watching the video stream.

In a first aspect, an embodiment of the present disclosure provides a display control method, comprising:
  playing a first video in a first display area in a video stream playing interface of a preset application;
  receiving a switching instruction, and in response to a preset reminding condition being met, switching to play a second video in the first display area, wherein a display area for the second video is changed from the first display area to a second display area during the playing process, and a size of the second display area is smaller than a size of the first display area; and
  displaying preset prompt information outside the second display area in the video stream playing interface.

In a second aspect, an embodiment of the present disclosure provides a display control apparatus, comprising:
  a first video playing module configured to play a first video in a first display area in a video stream playing interface of a preset application;
  a second video playing module configured to receive a switching instruction, and in response to a preset reminding condition being met, switch to play a second video in the first display area, wherein a display area for the second video is changed from the first display area to a second display area during the playing process, and a size of the second display area is smaller than a size of the first display area; and
  a prompt information displaying module configured to display preset prompt information outside the second display area in the video stream playing interface.

In a third aspect, an embodiment of the present disclosure provides an electronic device, comprising a memory, a processor, and a computer program stored on the memory and executable on the processor, wherein the processor, when executing the computer program, implements the display control method according to the embodiment of the present disclosure.

In a fourth aspect, the present disclosure provides a computer-readable storage medium, having a computer program stored thereon, wherein the computer program, when executed by a processor, implements the display control method according to the embodiment of the present disclosure.

DETAILED DESCRIPTION

Figure 1:
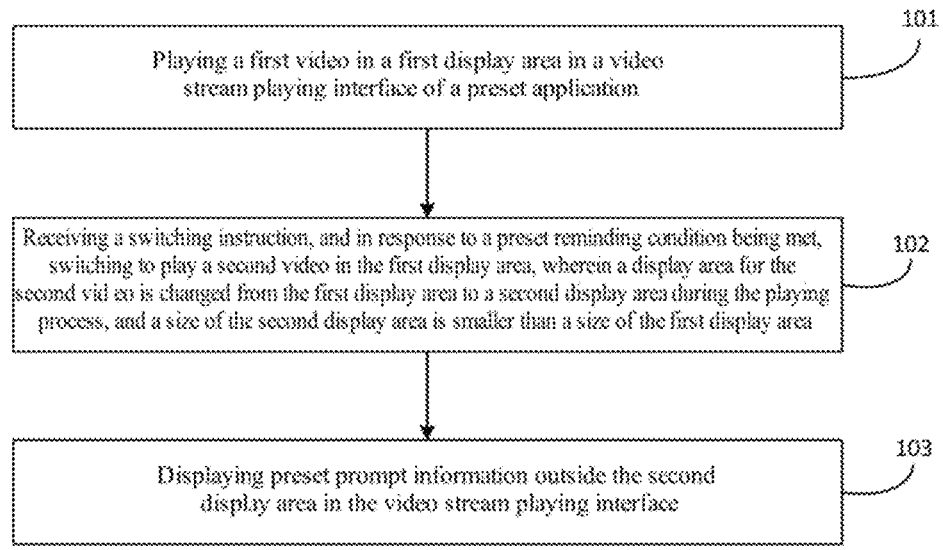
FIG. 1 is a schematic flow diagram of a display control method provided by an embodiment of the present disclosure.

The embodiments of the present disclosure will be described in more detail below with reference to the accompanying drawings. While certain embodiments of the present disclosure are shown in the drawings, it should be understood that the present disclosure may be implemented in various forms and should not be construed as limited to the embodiments set forth herein, which are provided for a more complete and thorough understanding of the present disclosure instead. It should be understood that the drawings and the embodiments of the present disclosure are for exemplary purposes only and are not intended to limit the scope of protection of the present disclosure.

It should be understood that various steps recited in method implementations of the present disclosure may be performed in a different order, and/or performed in parallel. Furthermore, the method implementations may include additional steps and/or omit performing the illustrated steps. The scope of the present disclosure is not limited in this respect.

The term "include" and variations thereof used herein are intended to be open-ended, i.e., "including but not limited to". The term "based on" is "at least partially based on". The term "one embodiment" means "at least one embodiment"; the term "another embodiment" means "at least one other embodiment"; and the term "some embodiments" means "at least some embodiments". Definitions related to other terms will be given in the following description.

It should be noted that the concepts "first", "second", and the like mentioned in the present disclosure are only used for distinguishing different devices, modules or units, and are not used for limiting the order or interdependence of functions performed by the devices, modules or units.

It should be noted that modifications of "a" or "a plurality" mentioned in this disclosure are intended to be illustrative rather than restrictive, and that those skilled in the art should appreciate that they should be understood as "one or more" unless otherwise explicitly stated in the context.

Names of messages or information exchanged between a plurality of devices in the implementations of the present disclosure are for illustrative purposes only, and are not intended to limit the scope of the messages or information.

In the embodiments described below, optional features and examples are concurrently provided in each embodiment, and each numbered embodiment should not be regarded as only one technical solution.

FIG. 1 is a schematic flow diagram of a display control method according to an embodiment of the present disclosure, where the method may be executed by a display control apparatus, and the apparatus may be implemented by software and/or hardware, and may be generally integrated in an electronic device. The electronic device can be a mobile device such as a mobile phone, a smart watch, a tablet computer, a personal digital assistant, and the like, and can also be other devices such as a desktop computer. As shown in FIG. 1, the method comprises:

step 101, playing a first video in a first display area in a video stream playing interface of a preset application.

In the embodiment of the present disclosure, the preset application may be, for example, a short video application or a live streaming application, and may also be another type of application. The preset application can provide a video stream playing function, wherein the video stream can include, for example, a short video stream, a live streaming video stream, and the like, and can be played in the video stream playing interface, and generally, continuous playing of a plurality of videos can be achieved under user operations or under default settings of the preset application. A source, a push mechanism, and the like of a video in the video stream may be set by the preset application according to actual needs. Generally, video content in the video stream can be released by a user logging in to the preset application, presented in a form of a work, or released by a platform corresponding to the preset application. The user can upload a work to be released to a server corresponding to the preset application, and the work is issued by the server to preset applications used by other users for presentation.

In the embodiment of the present disclosure, the first video may be understood as a video currently being played in the video stream playing interface, and may be any of the videos in the video stream. For a live streaming video stream, the first video may be understood as a live stream of a current anchor. The first video is usually played in a full-screen playing mode, that is, the display area (the first display area) of the first video usually occupies the entire video stream playing interface all the time, and of course, may also be adjusted according to actual needs.

Step 102, receiving a switching instruction, and in response to a preset reminding condition being met, switching to play a second video in the first display area, wherein a display area for the second video is changed from the first display area to a second display area during the playing process, and a size of the second display area is smaller than a size of the first display area.

In the embodiment of the present disclosure, the switching instruction, which is used for achieving video switching in the video stream, may be automatically generated by the preset application, or generated in response to an operation of the current user. Exemplarily, when a switching operation acted on the first video that is inputted by the current user is received, a switching instruction may be generated. The switching operation may be, for example, a swipe operation, such as a swipe up operation or a swipe left operation or the like, or may be an operation of triggering a control for achieving video switching, or the like.

The videos in the video stream are usually rich and numerous, so that a phenomenon that the user is addicted to watching the video stream occurs easily, and in order to reduce occurrence of this phenomenon, the user can be reminded. In the embodiment of the present disclosure, the preset reminding condition may be understood as a condition of reminding for the addiction phenomenon in the preset application, and content of the preset reminding condition may be preset, for example, based on an accumulated use duration or a fatigue degree of the user, or according to a time period in which the current time is located in a day or the like.

Optionally, the preset reminding condition comprises at least one of: detecting that a duration of the current user watching the video stream by using the preset application is greater than a preset duration threshold; detecting that the number of videos in the video stream watched by the current user by using the preset application is greater than a preset number threshold; detecting that a value of a preset indicator of the current user reaches a preset indicator threshold, wherein the preset indicator is used for representing a fatigue degree of the user; or detecting that a current time reaches a set time.

Exemplarily, the duration of the current user watching the video stream by using the preset application may be determined by counting a display duration of the video stream playing interface, and the preset duration threshold may be set according to actual needs, for example, 2 hours, and if the duration is greater than 2 hours, it can be considered that the current user has watched the video stream for a long time, so that it can be considered that the preset reminding condition is met. Similarly, when the number of videos watched by the user is large, it can be considered that the preset reminding condition is met. Exemplarily, the preset indicator may include a heart rate, a blinking frequency, a facial expression and the like, the value of the preset indicator may, with permission of the user, be obtained by using a preset component (such as a camera) and the like in the electronic device, or by using a device (such as a bracelet or a smart watch) having a communication relationship with the electronic device, and if the value of the preset indicator reaches the preset indicator threshold, it is indicated that the user is currently fatigued, so that a preset reminding event may be triggered. Exemplarily, the set time may be a certain time in late night or early morning, which is usually a rest time of the user, and when it is detected the current time reaches the set time, it can be considered that the preset reminding condition is met.

Optionally, the preset reminding condition may also be set by the user himself, such that the electronic device can determine more intelligently a reminding opportunity which fits the needs of the user himself.

In the embodiment of the present disclosure, the second video may be the next video to the first video in the video stream, wherein for a live streaming video stream, the second video may be a live stream of a next anchor; and the second video may also be a video other than the video stream, it is assumed that according to an original playing order in the video stream, the first video is followed by a third video, that is, the third video is the next video to the first video in the video stream, then in response to the preset reminding condition being met, the second video may be inserted before the third video to be played preferentially. If the second video is a video other than the video stream, the second video may be a video including preset prompt content, wherein the preset prompt content is used for reminding the current user to pause watching the video stream, to enhance the reminding effect. Herein, the preset prompt content may comprise a reminding video of a target character image dictating reminder information. The second video may also be a video with animation special effects, a video including eye protection images, a public welfare video, or the like.

Exemplarily, if the second video is the next video to the first video in the video stream, in response to the preset reminding condition being not met, it shows that anti-addiction reminder for the user is not needed, so that in response to receiving a switching instruction for the currently played first video, it is possible to switch to play the second video in the video stream playing interface, and the second video is played in the same manner as the first video, for example, the display area for the second video always occupies the entire video stream playing interface.

Exemplarily, if the second video is a video other than the video stream, in response to the preset reminding condition being not met, and in response to receiving a switching instruction for the currently played first video, it is possible to switch to play a next video in the video stream in the video stream playing interface, for example, the third video described above, and the third video is played in the same manner as the first video, for example, a display area of the third video always occupies the entire video stream playing interface.

In the embodiment of the present disclosure, in response to the preset reminding condition being met, when the switching instruction is received, switching is made to play the second video in the first display area. In order to strengthen the user's perception of the anti-addiction reminder, the playing manner of the second video is adjusted, that is, the display area of the second video is changed from large to small during the playing process, i.e., changed from the first display area for the first video to the second display area with a smaller size. Herein, the size of the display area can be measured by using its area. A shape of the first display area and a shape of the second display area may be the same or not. Generally, the shape of the first display area is generally matched with a shape of a screen of the electronic device, and may be, for example, a rectangle, denoted as a first rectangle, and the second display area may be a second rectangle having at least one of a smaller length or width than the first rectangle. Furthermore, the second display area may also be a circle, triangle, heart shape, or another irregular shape, such as an exclamation mark shape or the like.

In the embodiment of the present disclosure, the display area for the second video is changed from the first display area to the second display area during the playing process, and by means of a smaller display area, the current user is caused to have the perception of the change in the video playing manner, and in combination with the preset prompt information, the perception of the anti-addiction reminder can be enhanced; moreover, the changing from the first display area to the second display area avoids abruptness and interruption perceptions caused by directly playing the second video in the second display area, so that an antipathetic emotion of the user is reduced, and the user's video browsing experience is taken into consideration.

Optionally, after the second video is played in the first display area for a first preset duration, it directly changes to continue playing the second video in the second display area; optionally, after the second video is played in the first display area for a first preset duration, the first display area is dynamically shrunk to the second display area and this shrinking process lasts for a second preset duration, and then playing of the second video is continued in the second display area; and optionally, after playing of the second video is completed in the first display area, it immediately directly changes to statically display a video screen in the second display area. Optionally, after the second video is played in the first display area for a first preset duration, the first display area is dynamically shrunk to the second display area and this shrinking process lasts for a third preset duration, wherein the first preset duration and the third preset duration are a total playing duration of the second video, and then it directly changes to statically display a video screen in the second display area.

Exemplarily, during the process of changing the first display area to the second display area, and/or after changing the first display area to the second display area, the video screen content in the second video may be proportionally shrunk, or part of the video screen content may be played.

Optionally, after the display area for the second video is changed to the second display area, the method further comprises: continuing playing the second video in the second display area. Herein, if all video frames in the second video have been played at least once, looping the playing of the second video can be continued.

Step 103, displaying preset prompt information outside the second display area in the video stream playing interface.

Exemplarily, the preset prompt information may be used for reminding the current user to pause watching the video stream, for example, reminding the user to take a break, or reminding the user to close the preset application, or the like. Optionally, the preset prompt information may include a prompt bar, which may include at least one of text prompt information or pattern prompt information; the preset prompt information may also include prompt voice, namely, playing voice prompt information while displaying the text prompt; the preset prompt information may also include a dynamic image, wherein the dynamic image may include a dynamic portrait, through actions of which prompt is made. The preset prompt information may also include a combination of the various information, for example, include the prompt bar, the voice prompt, and the dynamic image concurrently, wherein the text content, the voice content, and the image content work together to achieve a better reminding effect.

In the embodiment of the present disclosure, the time when the preset prompt information appears and how it appears may be determined according to actual needs. The preset prompt information may appear when or after the display area for the second video is changed to the second display area; and if the display area for the second video is gradually changed from the first display area to the second display area, the preset prompt information may also appear in the changing process.

Optionally, during the process of changing the display area for the second video from the first display area to the second display area, and/or after changing the display area for the second video from the first display area to the second display area, the preset prompt information appears in the video stream playing interface in a preset gradually changing manner. Herein, the preset gradually changing manner may be, for example, that transparency is gradually changed from 1 to 0; and the preset gradually changing manner may also be a gradual movement from a first position (e.g., a position at a preset display boundary in the video stream playing interface) in the video stream playing interface to a second position which is located outside the second display area in the video stream playing interface.

Optionally, after the preset prompt information is displayed, if the current user wants to continue watching the video in the video stream, video switching may be achieved by inputting a related operation. In order to ensure the anti-addiction reminding effect, some preset conditions can be added, so that switching is allowed in response to the preset condition(s) being met. The preset condition may be, for example, a time-dimensional condition; for example, switching is allowed after the playing duration of the second video is greater than a preset playing duration threshold; for another example, if the second video is a video containing a character action, switching is allowed after it is detected that the current user completes an action matched with the character action in the video, which enhances interestingness, and can effectively alleviate a negative emotion such as anxiety or the like when the user cannot switch the video.

The display control method provided in the embodiment of the present disclosure, comprises: playing a first video in a first display area in a video stream playing interface of a preset application; receiving a switching instruction, and in response to a preset reminding condition being met, switching to play a second video in the first display area, wherein a display area for the second video is changed from the first display area to a second display area during the playing process, and a size of the second display area is smaller than a size of the first display area; and displaying preset prompt information outside the second display area in the video stream playing interface. With the above technical solution, during the process of a user watching the video stream by using the preset application, when a video switching instruction is received, in response to the preset reminding condition being met, the playing of the video is switched, the display area for the video after the switching is shrunk during the playing process, and the prompt information is displayed in the video stream playing interface; by combining the shrinking change in the display size and the prompt information, the user's perception of anti-addiction can be strengthened, and the reminding effect can be enhanced, to solve the problem that the user is easily addicted to watching the video stream, meanwhile, the video after the switching is changed from the original display area to the smaller display area, which avoids abruptness and interruption perceptions caused by directly playing the video in the smaller area, so that the video watching experience of the user is ensured.

In some embodiments, the method may further comprise: in response to receiving a first preset operation for the second video in the second display area, changing the display area for the second video from the second display area to the first display area, and continuing playing the second video in the first display area. Such setting has the advantage that, the user can be supported to switch the display area for the second video back to the first display area, for example, switch to the full-screen playing mode to continue playing the second video, so that the watching experience of the user is ensured. The first preset operation may be, for example, a click operation, a long-press operation, a swipe operation, or the like, and the first preset operation may be directly acted on the second video, or may be acted on a control associated with the second video, for example, a button for switching to the first display area to continue playing the second video, or the like.

In some embodiments, during the process of continuing playing the second video in the first display area, the method further comprises: in response to receiving a second preset operation for the second video in the first display area, changing the display area for the second video from the first display area to the second display area, and continuing playing the second video in the second display area. Such setting has the advantage that, the user can be also supported to switch back to the second display area to continue playing the second video, which also facilitates the user continuing viewing the preset prompt information.

Optionally, the second preset operation includes an operation for achieving video switching in the video stream. Such setting has the advantage that, the user's operation habit of switching the videos is taken into consideration. For example, the second preset operation is a swipe up operation, and the user is accustomed to switch the videos in the video stream by using the swipe up operation, then when the current display area for the second video is consistent with that of the video in the normally played video stream, the user can continue to perform video switching by the swipe up operation; however, since the second video is played after the preset reminding event is triggered, switching to the third video may not be made, but switching back to the second display area is made to continue playing the second video, thereby enhancing the reminding effect of anti-addiction.

In some embodiments, the method further comprises: when the switching instruction is received, in response to a preset reminding condition being met, starting a countdown; wherein during the process of continuing playing the second video in the first display area, the method further comprises: in response to receiving a second preset operation for the second video in the first display area, determining whether the countdown has ended, and based on a determination result that the countdown has not ended, changing the display area for the second video from the first display area to the second display area and continuing playing the second video in the second display area. Such setting has the advantage that, before the countdown has ended, the user can't switch to the third video temporarily by inputting the second preset operation for switching the videos in the video stream, thereby strengthening the reminding effect of anti-addiction.

Herein, a total duration of the countdown may be, for example, 10 seconds. In order to reduce the user's confusion of being incapable of switching to the third video temporarily and alleviate the generated negative emotion, countdown information can be displayed outside the second display area in the video stream playing interface, wherein the countdown information can include a current countdown time and can also include related text descriptions. For example, there are 5 seconds left in the current countdown, and "Take a break of 5 seconds before watching the next video" can be displayed. In addition, an opinion feedback entry may be displayed outside the second display area in the video stream playing interface, thereby providing the user with a way to express his own ideas, which is beneficial to alleviating the negative emotion.

In some embodiments, the method further comprises: when the switching instruction is received, in response to the preset reminding condition being met, starting a countdown; wherein during the process of continuing playing the second video in the first display area, the method further comprises: in response to receiving a second preset operation for the second video in the first display area, determining whether the countdown has ended, and switching to play a third video in the first display area based on a determination result that the countdown has ended. Such setting has the advantage that, after the countdown has ended, the current user has taken a certain rest, and in order to ensure the use experience of the user and avoid excessive interference to the user, it can be allowed to, after the countdown has ended, directly switch to play the third video from the state of playing the second video in the first display area, without the need of returning to the second display area to continue playing the second video.

In some embodiments, when the switching instruction is received, in response to the preset reminding condition being met, a countdown is started; and a third video is played in the first display area based on detecting a determination result that the countdown has ended. Such setting has the advantage that, after the countdown has ended, the current user has taken a certain rest, in order to ensure the use experience of the user and avoid excessive interference to the user, it can be allowed to, after the countdown has ended, automatically switch to play the third video.

Optionally, based on detecting a determination result that the countdown has ended, in response to receiving the second preset operation for the second video, the third video may be played in the first display area. Such setting has the advantage that, after the countdown has ended, the switching time can be selected by the user himself, which makes the video switching more flexible.

In some embodiments, after the switching instruction is received, the method further comprises: displaying a preset control outside the second display area in the video stream playing interface; and in response to a trigger operation for the preset control, playing a third video in the first display area. Such setting has the advantage that, at present, a common video switching operation for the video stream is a swipe operation, however, the manner of displaying the preset control in the video stream playing interface and switching to the third video by triggering the preset control is different from the common switching manner, which increases the user's learning cost of switching the videos to a certain extent, and is beneficial to enhancing the anti-addiction perception of the user, so that the reminding effect is improved.

In the embodiment of the present disclosure, the time when the preset control appears and how it appears may be determined according to actual needs. The preset control may appear when or after the display area for the second video is changed to the second display area; if the display area for the second video is gradually changed from the first display area to the second display area, the preset control can also appear during the changing process; and the preset control can also appear after the countdown has ended, etc.

Optionally, during the process of changing the display area for the second video from the first display area to the second display area, and/or after changing the display area for the second video from the first display area to the second display area, the preset control appears in the video stream playing interface in a preset gradually changing manner. The preset gradually changing manner herein may be the same as or different from the preset gradually changing manner described above.

In some embodiments, while playing the first video in the first display area in the video stream playing interface of the preset application, the method further comprises: displaying a first preset interaction control in the video stream playing interface, wherein during the process of playing the second video in the video stream playing interface, the method further comprises: hiding the first preset interaction control. Such setting has the advantage that, the difference in the playing manner between the second video and the first video is strengthened, which is beneficial to enhancing the user's anti-addiction perception, and improves the reminding effect. Herein, the first preset interaction control may include, for example, a like control, a comment control, a page switching control, and the like.

In the embodiment of the present disclosure, during the process of changing the display area for the second video from the first display area to the second display area, and/or after changing the display area for the second video from the first display area to the second display area, the method may further comprise: displaying a dynamic background pattern outside the second display area in the video stream playing interface, wherein the dynamic background pattern is changed according to a change in video content in the second video. Such setting has the advantage that, the transition of the second video from the first display area to the second display area is more natural, which improves the interface aesthetics, so that both the user's watching experience and the reminding effect are taken into consideration. Herein, the dynamic background pattern can be the currently played video screen, and definition of the dynamic background pattern is smaller than that of the video screen of the second video, so that excessive interference to the watching of the second video is avoided.

In the embodiment of the present disclosure, after changing the display area for the second video from the second display area to the first display area, the method may further comprise: displaying a second preset interaction control in the first display area, wherein the second preset interaction control is used for performing a preset operation on the second video, the preset operation comprising at least one of a playing control operation, a downloading operation, or a sharing operation. Such setting has the advantage that when the second video is played in the first display area, the user is allowed to perform control related to the playing of the second video, such as pause, continue, forward backward, and the like, and when the user is interested in video content, the user can also save or share the video content or the like, which enhances the interaction sense and is beneficial to alleviating a negative emotion such as anxiety when the user is incapable of switching the videos.

Figure 2:
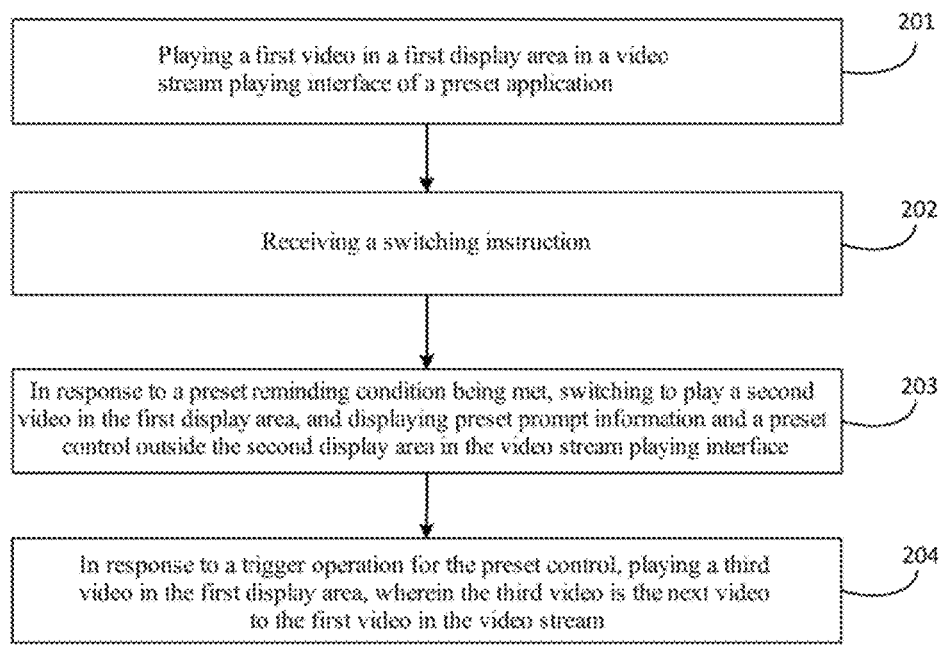
FIG. 2 is a schematic flow diagram of another display control method provided by an embodiment of the present disclosure.

FIG. 2 is a schematic flow diagram of another display control method according to an embodiment of the present disclosure, in which modifications are made based on the optional solutions in the above embodiments, the method comprising:

step 201, playing a first video in a first display area in a video stream playing interface of a preset application.

Figure 3:
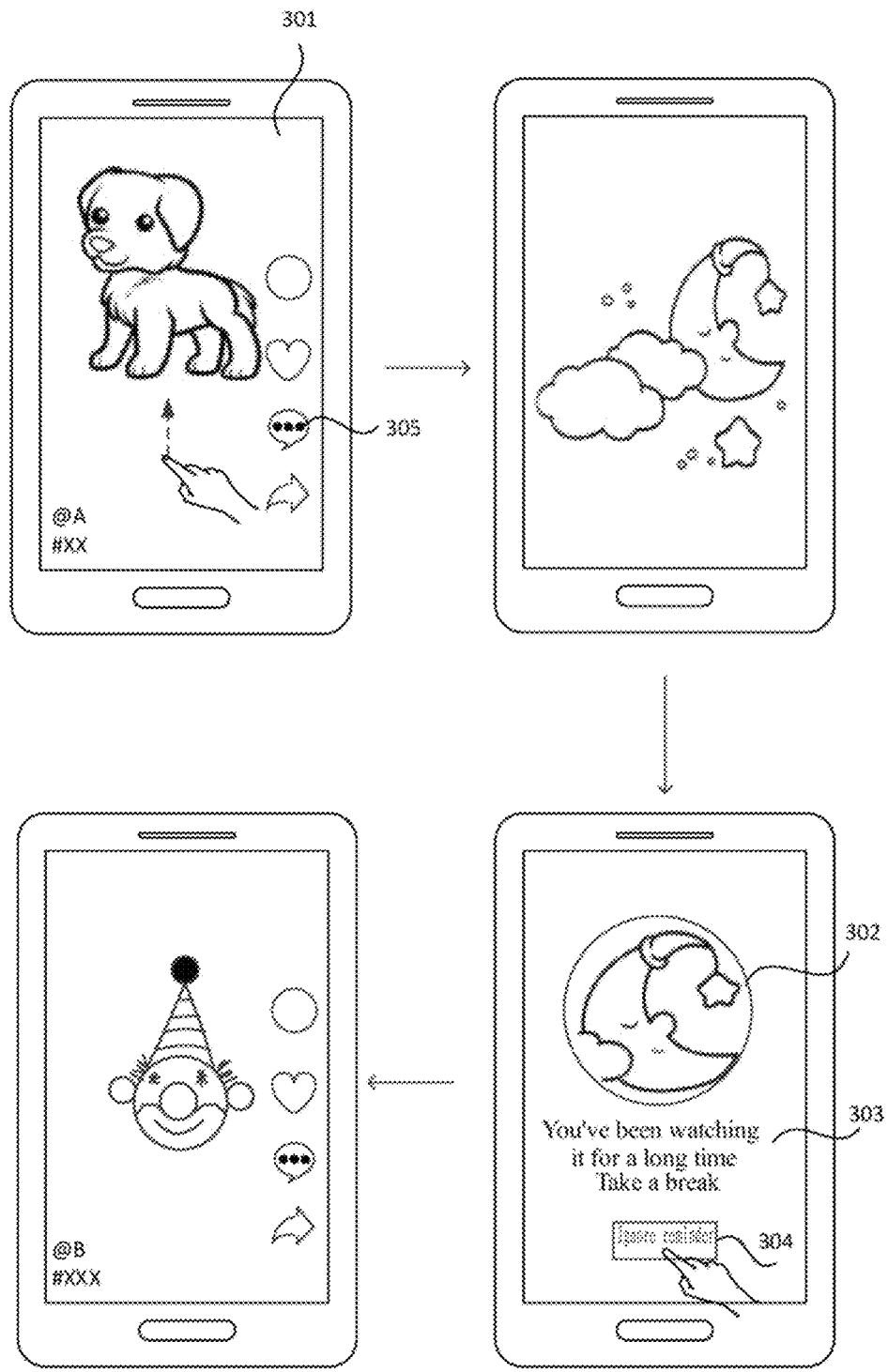
FIG. 3 is a schematic interface diagram of an interaction process provided by an embodiment of the present disclosure.

For convenience of illustration, an example that the preset application is a short video application is taken below. FIG. 3 is a schematic interface diagram of an interaction process provided by an embodiment of the present disclosure. As shown in FIG. 3, a first video is being played in a first display area 301 (which may be understood as a full screen area) in a video stream playing interface, wherein video content in the first video includes a puppy.

Step 202, receiving a switching instruction.

During the process of watching the first video, a user can input a swipe up operation in the video stream playing interface, and at this time, the preset application receives the corresponding switching instruction.

Step 203, in response to a preset reminding condition being met, switching to play a second video in the first display area, and displaying preset prompt information and a preset control outside the second display area in the video stream playing interface.

Herein, the display area for the second video is changed from the first display area to the second display area during the playing process, a size of the second display area is smaller than a size of the first display area, and the preset prompt information is used for reminding the current user to pause watching the video stream.

Assuming that during the process of the short video application playing a short video stream, it is detected that a duration of the current user watching the short video stream is greater than 2 hours (a preset duration threshold), in order to avoid that the user continues being addicted, it can be considered that the preset reminding condition is met, so that the current user needs to be reminded to pause watching the short video stream.

Optionally, the second video is a video other than the video stream, and may include preset prompt content, so that it may also be referred to as a reminding video. As shown in FIG. 3, first, the second video starts to be played in full screen in the first display area in the video stream playing interface, wherein video content in the second video is an animation representing late night, for example, it includes a moon and a star and the like in the figure. After the second video is played in the first display area for a first preset duration (e.g., 2 seconds), the first display area is dynamically shrunk to a second display area 302, a video screen of the second video is changed accordingly, and the shrinking process lasts a second preset duration (e.g., 1 second), and then the playing of the second video is continued in the second display area 302; if the second video content has been completely played once, looping the playing of the second video can be continued. After the first display area is shrunk to the second display area 302, preset prompt information 303 and a preset control 304 may be displayed outside the second display area in the video stream playing interface. The preset prompt information 303 is used for reminding the current user to pause watching the video stream, such as "you've been watching it for a long time, take a break" in FIG. 3. Text information for representing a function or effect of the preset control, such as "ignore reminder" in FIG. 3, may be displayed in the preset control 304.

As shown in FIG. 3, during the process of playing the second video, the first preset interaction control displayed when the first video is played, such as a comment control 305, may be hidden, to strengthen the difference in the playing manner between the second video and the first video, which is beneficial to enhancing the anti-addiction perception of the user, and improves the reminding effect.

Step 204, in response to a trigger operation for the preset control, playing a third video in the first display area, wherein the third video is the next video to the first video in the video stream.

Exemplarily, as shown in FIG. 3, if the current user wants to continue watching a short video, video switching may be performed by triggering the preset control 304, for example, after the current user clicks the preset control 304, the third video is played in the first display area in full screen.

Exemplarily, for a short video application, a short video recommendation queue corresponding to the video stream is generally determined according to preset video push rules, that is, short videos to be played that are contained in the video stream and a playing order of the short videos are determined. Assuming that the next video to the puppy video in the short video recommendation queue is a clown video, the clown video is played in full screen after the user clicks the preset control 304.

According to the display control method provided in the embodiment of the present disclosure, during a process of playing a video stream in a video stream playing interface of a preset application, when a video switching instruction is received, if a preset reminding condition is met, a video other than the played video stream is inserted and continuously changed from an initial video playing display area to a display with a smaller size during the playing process, and information prompting the user to pause watching the video stream and a preset control for continuing switching the videos are displayed; by combining the shrinking change in the display size and the prompt information, the anti-addiction perception of the user can be strengthened, so that the reminding effect is enhanced; the switching between the playing of the normal video in the video stream and the playing of the reminding video is smoother, and the transition is more natural, so that the user's experience of watching the video is ensured; and a control for continuing switching to play the video in the video stream is provided, to avoid excessive interference to the user.

Figure 4:
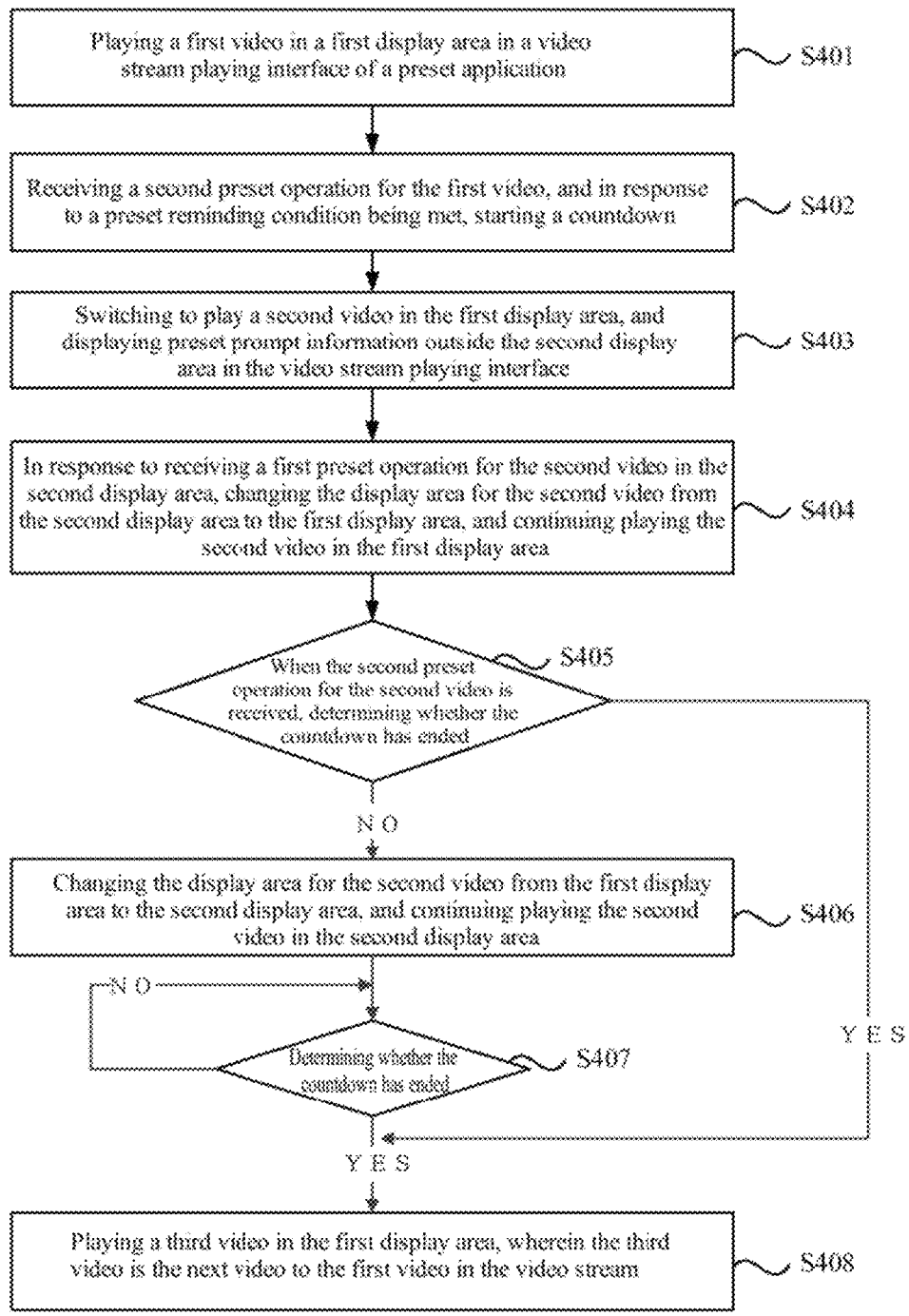
FIG. 4 is a schematic flow diagram of still another display control method provided by an embodiment of the present disclosure.

FIG. 4 is a schematic flow diagram of a display control method provided by an embodiment of the present disclosure, in which modifications are made based on the optional solutions in the above embodiments, and as shown in FIG. 4, the method may comprise:

step 401, playing a first video in a first display area in a video stream playing interface of a preset application.

Step 402, receiving a second preset operation for the first video, and in response to a preset reminding condition being met, starting a countdown.

Figure 5:
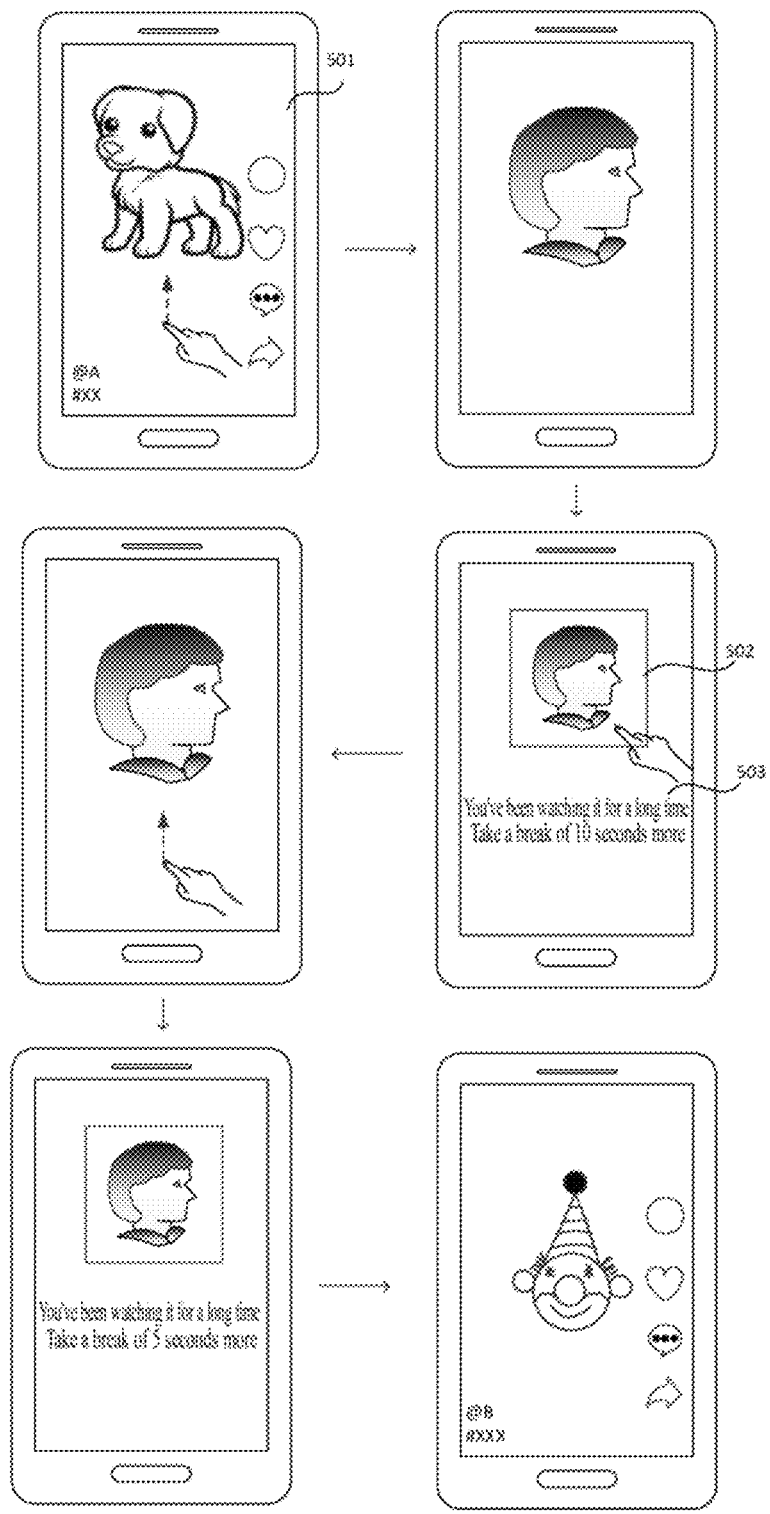
FIG. 5 is a schematic interface diagram of another interaction process provided by an embodiment of the present disclosure.

For convenience of illustration, an example that the preset application is a short video application is still taken below. FIG. 5 is a schematic interface diagram of another interaction process provided by an embodiment of the present disclosure. As shown in FIG. 5, a first video is being played in a first display area 501 (which may be understood as a full screen area) in a video stream playing interface, wherein video content in the first video includes a puppy, a user may input a second preset operation in the video stream playing interface during the process of watching the first video, and the preset application receives the second preset operation and starts a countdown; it is assumed that the countdown has a start time of 15 seconds.

Step 403, switching to play a second video in the first display area, and displaying preset prompt information outside the second display area in the video stream playing interface.

Herein, the display area for the second video is changed from the first display area to the second display area during the playing process, a size of the second display area is smaller than a size of the first display area, and the preset prompt information is used for reminding a current user to pause watching the video stream.

Optionally, the second video is a video other than the video stream. The second video may contain preset prompt content, for reminding the current user to watch the video stream. The preset prompt content comprises a reminding video of a target character image dictating reminder information. The target character image is contained in a preset character image set, which includes a character image of a first user in the preset application, the first user having a preset association relation with the current user in the preset application. The preset association relation may include the current user following the first user, which may also be understood as the current user being a fan of the first user in some preset applications; and the preset association may further include the first user being a friend of the current user, which may also be understood as the current user and the first user following each other in some preset applications.

Before this step, the method may further comprise: determining a target character image from a preset character image set according to historical interaction data generated during the process of the current user using the preset application; screening a target reminding video from a reminding video set of the target character image; and determining a second video to be displayed according to the target reminding video. Assuming that the current user follows 10 short video authors, the corresponding preset character image set may include account identifications or character image identifications of the 10 short video authors. Assuming that the number of times that the current user has liked short video works of the user A in the last 1 month is the largest, which indicates that the current user comparatively approves the user A, so that a reminding video of the user A is more convincing for the current user, then the character image of the user A can be determined as the target character image, and then a reminding video conforming to the current scenario can be selected from the reminding video set of the user A, and the reminding video is determined as the second video.

As shown in FIG. 5, first, the second video starts to be played in full screen in the first display area in the video stream playing interface, wherein video content in the second video is that the user A reminds the current user to take a break, for example, the video content includes the user A facing a camera and dictating reminder information, and the like. After the second video is played in the first display area for a first preset duration (for example, 3 seconds), the first display area is dynamically shrunk to a second display area 502, a video screen of the second video is changed accordingly, the shrinking process lasts a second preset duration (for example, 2 seconds), and then the playing of the second video is continued in the second display area 502. After being shrunk to the second display area 502, preset prompt information 503 may be displayed outside the second display area in the video stream playing interface. The preset prompt information is used for reminding the current user to pause watching the video stream, and the preset prompt information may further include countdown information, for example, "you've been watching it for a long time, take a break of 10 seconds more" in FIG. 3.

Step 404, in response to receiving a first preset operation for the second video in the second display area, changing the display area for the second video from the second display area to the first display area, and continuing playing the second video in the first display area.

Exemplarily, the first preset operation may be, for example, clicking the second video in the second display area. As shown in FIG. 5, after the user clicks the second display area 502 where the second video is being played, it changes to continuing playing the second video in the first display area in full screen, so that the current user can watch the reminding video of the user A more clearly in the full screen display mode.

Step 405, when a second preset operation for the second video is received, determining whether the countdown has ended, and executing step 408 based on a determination result that the countdown has ended; and executing step 406 based on a determination result that the countdown has not ended.

Exemplarily, assuming that the current user wants to switch to watch a next video in the video stream during the process of watching the second video in the full-screen mode, a second preset operation for the second video may be input. As shown in FIG. 5, the user inputs a swipe up operation. Assuming that there are still 5 seconds left in the countdown and the countdown has not ended, step 406 is executed.

Step 406, changing the display area for the second video from the first display area to the second display area, and continuing playing the second video in the second display area.

Exemplarily, since the countdown has not ended when the user inputs the second preset operation, switching to a next video is not performed temporarily, but it changes to continuing playing the second video in the second display area. As shown in FIG. 5, the countdown information in the interface is updated from the original 10 seconds to 5 seconds, to inform the user how soon it is expected that the content can be switched, so that a negative emotion generated by the user being incapable of switching content currently is alleviated.

Step 407, determining whether the countdown has ended, and executing step 408 based on a determination result that the countdown has ended; and executing step 407 repeatedly based on a determination result that the countdown has not ended.

Exemplarily, after returning to the second display area to continue playing the second video, dynamical updating of the countdown information may be continued, the preset application determines continuously whether the countdown has ended, and based on a determination result that the countdown has ended, step 408 is executed to automatically switch to play a third video in the first display area.

Step 408, playing a third video in the first display area, wherein the third video is the next video to the first video in the video stream.

According to the display control method provided in the embodiment of the present disclosure, during a process of playing a video stream in a video stream playing interface of a preset application, when a video switching operation is received, in response to a preset reminding condition being met, a countdown is started, and a reminding video other than the played video stream is inserted, wherein the reminding video is continuously changed from an initial video playing display area to a display area with a smaller size during the playing process and information prompting a user to pause watching the video stream is displayed; and before the countdown has ended, the user can autonomously operate to switch the playing of the reminding video between the display areas with two different sizes, and after the countdown has ended, it is possible to automatically switch to play a next video in the video stream. By combining the shrinking change in the display size, the prompt information, and the countdown control together, the user's perception of anti-addiction can be strengthened, and the reminding effect is enhanced; and the switching between the playing of the reminding video and the playing of the normal video in the video stream is smoother, and the transition is more natural; and the video switching is completed automatically after the countdown has ended, which is equivalent to a delay response to the switching operation inputted by the user for the first video, so that both the anti-addiction reminding effect and the experience when the user using the preset application are taken into consideration.

Figure 6:
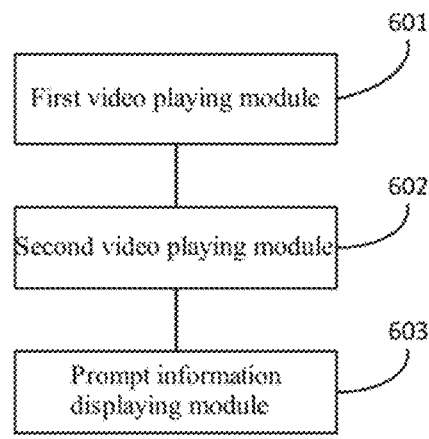
FIG. 6 is a structural block diagram of a display control apparatus provided by an embodiment of the present disclosure.

FIG. 6 is a structural block diagram of a display control apparatus provided by an embodiment of the present disclosure, where the apparatus may be implemented by software and/or hardware, may be generally integrated in an electronic device, and may perform display control by performing the display control method. As shown in FIG. 6, the apparatus comprises:

a first video playing module 601 configured to play a first video in a first display area in a video stream playing interface of a preset application;

a second video playing module 602 configured to receive a switching instruction, and in response to a preset reminding condition being met, switch to play a second video in the first display area, wherein a display area for the second video is changed from the first display area to a second display area during the playing process, and a size of the second display area is smaller than a size of the first display area; and a prompt information displaying module 603 configured to display preset prompt information outside the second display area in the video stream playing interface.

According to the display control apparatus provided in the embodiment of the present disclosure, during the process of a user watching a video stream by using a preset application, when a video switching instruction is received, in response to a preset reminding condition being met, video playing is switched, a display area for the video after the switching is shrunk during the playing process, and prompt information is displayed in the video stream playing interface; by combining the shrinking change in the display size and the prompt information, the user's perception of anti-addiction can be strengthened, and the reminding effect can be enhanced, to solve the problem that the user is easily addicted to watching the video stream, meanwhile, the video after the switching is changed from the original display area to a smaller display area, which avoids abruptness and interruption perceptions caused by directly playing the video in the smaller area, so that the video watching experience of the user is ensured.

Optionally, the second video playing module is further configured to: after the display area for the second video is changed to the second display area, continue playing the second video in the second display area.

Optionally, the second video playing module is further configured to: in response to receiving a first preset operation for the second video in the second display area, change the display area for the second video from the second display area to the first display area, and continue playing the second video in the first display area.

Optionally, the second video playing module is further configured to: during the process of continuing playing the second video in the first display area, in response to receiving a second preset operation for the second video in the first display area, change the display area for the second video from the first display area to the second display area, and continue playing the second video in the second display area, wherein the second preset operation comprises an operation for achieving video switching in the video stream.

Optionally, the apparatus further comprises: a countdown starting module configured to, when the switching instruction is received, in response to the preset reminding condition being met, start a countdown; and the second video playing module is further configured to: during the process of continuing playing the second video in the first display area, in response to receiving a second preset operation for the second video in the first display area, determine whether the countdown has ended, and based on a determination result that the countdown has not ended, change the display area for the second video from the first display area to the second display area and continue playing the second video in the second display area.

Optionally, the second video playing module is further configured to: during the process of continuing playing the second video in the first display area, in response to receiving a second preset operation for the second video in the first display area, determine whether the countdown has ended, and switch to play a third video in the first display area based on a determination result that the countdown has ended.

Optionally, the second video playing module is further configured to: play a third video in the first display area based on detecting a determination result that the countdown has ended.

Optionally, the apparatus further comprises: a preset control displaying module configured to, after the switching instruction for the first video played currently in the first display area is received, display a preset control outside the second display area in the video stream playing interface; and the second video playing module is further configured to: in response to a trigger operation for the preset control, play a third video in the first display area.

Optionally, the first video playing module is further configured to: at the time of playing the first video in the first display area in the video stream playing interface of the preset application, display a first preset interaction control in the video stream playing interface. The second video playing module is further configured to: hide the first preset interaction control during the process of playing the second video in the video stream playing interface.

Optionally, the second video playing module is further configured to: during the process of changing the display area for the second video from the first display area to the second display area and/or after changing the display area for the second video from the first display area to the second display area, display a dynamic background pattern outside the second display area in the video stream playing interface, wherein the dynamic background pattern is changed according to a change in video content in the second video.

Optionally, the second video playing module is further configured to: after changing the display area for the second video from the second display area to the first display area, displaying a second preset interaction control in the first display area, wherein the second preset interaction control is used for performing a preset operation on the second video, the preset operation comprising at least one of a playing control operation, a downloading operation, or a sharing operation.

Optionally, during the process of changing the display area for the second video from the first display area to the second display area, and/or after changing the display area for the second video from the first display area to the second display area: at least one of the preset prompt information or the preset control appears in the video stream playing interface in a preset gradually changing manner.

Optionally, the preset reminding condition comprises at least one of:

detecting that a duration of a current user watching the video stream by using the preset application is greater than a preset duration threshold; detecting that the number of videos in the video stream watched by a current user by using the preset application is greater than a preset number threshold; detecting that a value of a preset indicator of a current user reaches a preset indicator threshold, wherein the preset indicator is used for representing a fatigue degree of the user; or detecting that a current time reaches a set time.

Figure 7:
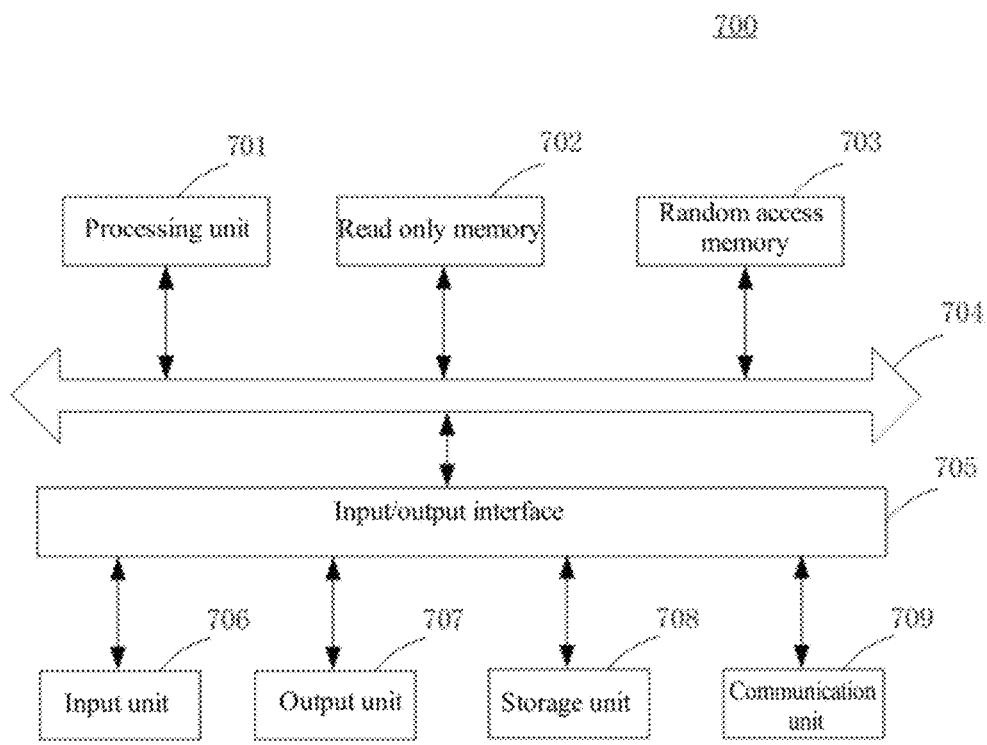
FIG. 7 is a structural block diagram of an electronic device provided by an embodiment of the present disclosure.

Reference is made below to FIG. 7, which shows a schematic structural diagram of an electronic device 700 suitable for implementing the embodiments of the present disclosure. The electronic device in the embodiments of the present disclosure may include a mobile terminal such as a mobile phone, a notebook computer, a digital broadcast receiver, a personal digital assistant (PDA), a tablet computer (PAD), a portable multimedia player (PMP), a vehicle-mounted terminal (e.g., vehicle-mounted navigation terminal), and the like, and a fixed terminal such as a digital television (i.e., digital TV), a desktop computer, and the like. The electronic device shown in FIG. 7 is merely an example.

As shown in FIG. 7, the electronic device 700 may comprise a processing unit (e.g., a central processing unit, a graphics processing unit, etc.) 701, which may perform various appropriate actions and processes according to a program stored in a read only memory (ROM) 702 or a program loaded from a storage unit 708 into a random access memory (RAM) 703. In the RAM 703, various programs and data necessary for the operation of the electronic device 700 are also stored. The processing unit 701, the ROM 702, and the RAM 703 are connected to each other by a bus 704. An input/output (I/O) interface 705 is also connected to the bus 704.

Generally, the following unit may be connected to the I/O interface 705: an input unit 706 including, for example, a touch screen, a touch pad, a keyboard, a mouse, a camera, a microphone, an accelerometer, a gyroscope, or the like; an output unit 707 including, for example, a liquid crystal display (LCD), a speaker, a vibrator, or the like; the storage unit 708, including, for example, a magnetic tape, a hard disk, or the like; and a communication unit 709. The communication unit 709 may allow the electronic device 700 to communicate with other devices, wirelessly or by wire, to exchange data. While FIG. 7 illustrates the electronic device 700 having various units, it should be understood that not all illustrated units are required to be implemented or provided. More or fewer units may be alternatively implemented or provided.

In particular, according to the embodiment of the present disclosure, the processes described above with reference to the flow diagrams may be implemented as a computer software program. For example, the embodiment of the present disclosure comprises a computer program product, which comprises a computer program carried on a non-transitory computer-readable medium, wherein the computer program contains program codes for performing the methods illustrated by the flow diagrams. In such an embodiment, the computer program may be downloaded and installed from a network via the communication unit 709, or installed from the storage unit 708, or installed from the ROM 702. The computer program, when executed by the processing unit 701, performs the above functions defined in the methods of the embodiments of the present disclosure.

It should be noted that the above computer-readable medium of the present disclosure may be a computer-readable signal medium or a computer-readable storage medium or a combination of the above two. The computer-readable storage medium may be, for example, but is not limited to, an electronic, magnetic, optical, electromagnetic, infrared, or semiconductor system, apparatus, or device, or a suitable combination of the foregoing. An example of the computer-readable storage medium may include, but is not limited to: an electrical connection having at least one wire, a portable computer diskette, a hard disk, a random access memory (RAM), a read only memory (ROM), an erasable programmable read only memory (for example, an electronic programmable read only memory (EPROM) or a flash memory), an optical fiber, a portable compact disc-read only memory (CD-ROM), an optical storage device, a magnetic storage device, or a suitable combination of the foregoing. In the present disclosure, the computer-readable storage medium may be any tangible medium containing or storing a program, wherein the program can be used by or in conjunction with an instruction execution system, apparatus, or device. However, in the present disclosure, the computer-readable signal medium may include a data signal propagated in baseband or as part of a carrier wave, in which computer-readable program codes are carried. Such a propagated data signal may take a variety of forms, including an electromagnetic signal, an optical signal, or a suitable combination of the forgoing. The computer-readable signal medium may also be any computer-readable medium other than the computer-readable storage medium, wherein the computer-readable signal medium can send, propagate, or transmit a program for use by or in conjunction with an instruction execution system, apparatus, or device. The program codes contained on the computer-readable medium may be transmitted using an appropriate medium, including: a wire, an optical cable, Radio Frequency (RF), etc., or a suitable combination of the foregoing.

The above computer-readable medium may be contained in the above electronic device; or may be exist separately without being assembled into the electronic device.

The above computer-readable medium has at least one program carried thereon, wherein the above at least one program, when executed by the electronic device, causes the electronic device to: play a first video in a first display area in a video stream playing interface of a preset application; receive a switching instruction, and in response to a preset reminding condition being met, switch to play a second video in the first display area, wherein a display area for the second video is changed from the first display area to a second display area during the playing process, and a size of the second display area is smaller than a size of the first display area; and display preset prompt information outside the second display area in the video stream playing interface.

Computer program codes for performing the operations of the present disclosure may be written in one or more programming languages or a combination thereof, wherein the above programming language includes but is not limited to an object-oriented programming language such as Java, Smalltalk, and C++, and also includes a conventional procedural programming language, such as the "C" programming language or a similar programming language. The program codes may be executed entirely on a user's computer, partly on the user's computer, as a stand-alone software package, partly on the user's computer and partly on a remote computer, or entirely on the remote computer or a server. In a scenario where the remote computer is involved, the remote computer may be connected to the user's computer through any type of network, including a local area network (LAN) or a wide area network (WAN), or may be connected to an external computer (for example, through the Internet using an Internet service provider).

The flow diagrams and block diagrams in the drawings illustrate the possibly implemented architecture, functions, and operations of the system, method, and computer program product according to various embodiments of the present disclosure. In this regard, each block in the flow diagrams or block diagrams may represent a module, a program segment, or a portion of codes, which includes at least one executable instruction for implementing a specified logical function. It should also be noted that, in some alternative implementations, functions noted in blocks may occur in a different order from those noted in the drawings. For example, two blocks shown in succession may, in fact, be executed substantially concurrently, or the blocks may sometimes be executed in a reverse order, which depends upon the functions involved. It will also be noted that each block in the block diagrams and/or flow diagrams, and a combination of the blocks in the block diagrams and/or flow diagrams, can be implemented by a special-purpose hardware-based system that performs specified functions or operations, or a combination of special-purpose hardware and computer instructions.

The involved modules described in the embodiments of the present disclosure may be implemented by software or hardware. The name of the module does not, in some cases, constitute a limitation on the module itself, for example, the first video playing module may also be described as "a module configured to play a first video in a first display area in a video stream playing interface of a preset application".

The functions described above herein may be executed, at least partially, by at least one hardware logic component. For example, an exemplary-type hardware logic component that may be used includes: a field-programmable gate array (FPGA), an application specific integrated circuit (ASIC), an application specific standard parts (ASSP), a system on chip (SOC), a complex programmable logic device (CPLD), and the like.

In the context of this disclosure, a machine-readable medium may be a tangible medium, which can contain, or store a program for use by or in conjunction with an instruction execution system, apparatus, or device. The machine-readable medium may be a machine-readable signal medium or a machine-readable storage medium. The machine-readable medium may include, an electronic, magnetic, optical, electromagnetic, infrared, or semiconductor system, apparatus, or device, or a suitable combination of the foregoing. An example of the machine-readable storage medium may include an electrical connection based on at least one wire, a portable computer diskette, a hard disk, a random access memory (RAM), a read only memory (ROM), an erasable programmable read only memory (EPROM or flash memory), an optical fiber, a portable compact disc-read only memory (CD-ROM), an optical storage device, a magnetic storage device, or a suitable combination of the foregoing.

According to one or more embodiments of the present disclosure, there is provided a display control method, comprising:
  playing a first video in a first display area in a video stream playing interface of a preset application;
  receiving a switching instruction, and in response to a preset reminding condition being met, switching to play a second video in the first display area, wherein a display area for the second video is changed from the first display area to a second display area during the playing process, and a size of the second display area is smaller than a size of the first display area; and
  displaying preset prompt information outside the second display area in the video stream playing interface.

According to one or more embodiments of the present disclosure, after the display area for the second video is changed to the second display area, the method further comprises: continuing playing the second video in the second display area.

According to one or more embodiments of the present disclosure, the method further comprises: in response to receiving a first preset operation for the second video in the second display area, changing the display area for the second video from the second display area to the first display area, and continuing playing the second video in the first display area.

According to one or more embodiments of the present disclosure, during the process of continuing playing the second video in the first display area, the method further comprises:
  in response to receiving a second preset operation for the second video in the first display area, changing the display area for the second video from the first display area to the second display area, and continuing playing the second video in the second display area, wherein the second preset operation comprises an operation for achieving video switching in the video stream.

According to one or more embodiments of the present disclosure, the method further comprises: in response to receiving the switching instruction and the preset reminding condition being met, starting a countdown;
  wherein during the process of continuing playing the second video in the first display area, the method further comprises:
  in response to receiving a second preset operation for the second video in the first display area, determining whether the countdown has ended, and based on a determination result that the countdown has not ended, changing the display area for the second video from the first display area to the second display area and continuing playing the second video in the second display area.

According to one or more embodiments of the present disclosure, the method further comprises:
  in response to receiving the switching instruction and the preset reminding condition being met, starting a countdown;
  wherein during the process of continuing playing the second video in the first display area, the method further comprises:
  in response to receiving a second preset operation for the second video in the first display area, determining whether the countdown has ended, and switching to play a third video in the first display area based on a determination result that the countdown has ended.

According to one or more embodiments of the present disclosure, the method further comprises:
  in response to receiving the switching instruction and the preset reminding condition being met, starting a countdown; and
  playing a third video in the first display area based on detecting a determination result that the countdown has ended.

According to one or more embodiments of the present disclosure, after the switching instruction is received, the method further comprises: displaying a preset control outside the second display area in the video stream playing interface; and in response to a trigger operation for the preset control, playing a third video in the first display area.

According to one or more embodiments of the present disclosure, at the same time of the playing a first video in a first display area in the video stream playing interface of a preset application, the method further comprises: displaying a first preset interaction control in the video stream playing interface; wherein during the process of playing the second video in the video stream playing interface, the method further comprises: hiding the first preset interaction control.

According to one or more embodiments of the present disclosure, during the process of changing the display area for the second video from the first display area to the second display area and/or after changing the display area for the second video from the first display area to the second display area, the method comprises: displaying a dynamic background pattern outside the second display area in the video stream playing interface, wherein the dynamic background pattern is changed according to a change in video content in the second video.

According to one or more embodiments of the present disclosure, after changing the display area for the second video from the second display area to the first display area, the method further comprises: displaying a second preset interaction control in the first display area, wherein the second preset interaction control is used for performing a preset operation on the second video, and the preset operation comprises at least one of a playing control operation, a downloading operation, or a sharing operation.

According to one or more embodiments of the present disclosure, during the process of changing the display area for the second video from the first display area to the second display area and/or after changing the display area for the second video from the first display area to the second display area: at least one of the preset prompt information or the preset control appears in the video stream playing interface in a preset gradually changing manner.

According to one or more embodiments of the present disclosure, the preset reminding condition comprises at least one of: detecting that a duration of a current user watching the video stream by using the preset application is greater than a preset duration threshold; detecting that the number of videos in the video stream watched by a current user by using the preset application is greater than a preset number threshold; detecting that a value of a preset indicator of a current user reaches a preset indicator threshold, wherein the preset indicator is used for representing a fatigue degree of the user; or detecting that a current time reaches a set time.

According to one or more embodiments of the present disclosure, there is provided a display control apparatus, comprising:
- a first video playing module configured to play a first video in a first display area in a video stream playing interface of a preset application;
- a second video playing module configured to receive a switching instruction, and in response to a preset reminding condition being met, switch to play a second video in the first display area, wherein a display area for the second video is changed from the first display area to a second display area during the playing process, and a size of the second display area is smaller than a size of the first display area; and
- a prompt information displaying module configured to display preset prompt information outside the second display area in the video stream playing interface.

What is claimed is:

1. A display control method, comprising:
    playing a first video in a first display area in a video stream playing interface of a preset application;
    in response to receiving a switching instruction and a preset reminding condition being met, switching to play a second video in the first display area, wherein a display area for the second video is changed from the first display area to a second display area during a playing process, and a size of the second display area is smaller than a size of the first display area;
    displaying preset prompt information outside the second display area in the video stream playing interface, wherein the preset prompt information is used for reminding a current user to pause watching the video stream played in the video stream playing interface;
    in response to receiving the switching instruction and the preset reminding condition being met, starting a countdown;
    continuing playing the second video without switching to play a third video based on detecting a determination result that the countdown has not ended;
    in response to receiving a first preset operation for the second video in the second display area, based on the determination result that the countdown has not ended, changing the display area for the second video from the second display area to the first display area, and continuing playing the second video in the first display area; and
    after changing the display area for the second video from the second display area to the first display area, displaying a preset interaction control in the first display area, wherein the preset interaction control is used for performing a preset operation on the second video, and the preset operation comprises at least one of a downloading operation or a sharing operation.

2. The method according to claim 1, after the display area for the second video is changed from the first display area to the second display area during the playing process, the method further comprising:
    continuing playing the second video in the second display area.

3. The method according to claim 1, further comprising:
    during the process of continuing playing the second video in the first display area, in response to receiving a second preset operation for the second video in the first display area, based on the determination result that the countdown has not ended, changing the display area for the second video from the first display area to the second display area, and continuing playing the second video in the second display area, wherein the second preset operation comprises an operation for achieving video switching in the video stream.

4. The method according to claim 1, further comprising:
    during the process of continuing playing the second video in the first display area, in response to receiving a second preset operation for the second video in the first display area, switching to play the third video in the first display area based on a determination result that the countdown has ended.

5. The method according to claim 1, further comprising:
    playing the third video in the first display area based on detecting a determination result that the countdown has ended.

6. The method according to claim 1, wherein, after the switching instruction is received, the method further comprises:

displaying a first preset control outside the second display area in the video stream playing interface; and
in response to a trigger operation for the first preset control, playing the third video in the first display area.

7. The method according to claim 6, further comprising at least one of the following:
during the process of changing the display area for the second video from the first display area to the second display area, at least one of the preset prompt information or the first preset control appearing in the video stream playing interface in a preset gradually changing manner; or
after changing the display area for the second video from the first display area to the second display area, at least one of the preset prompt information or the first preset control appearing in the video stream playing interface in a preset gradually changing manner.

8. The method according to claim 1, wherein, at a time of the playing the first video in the first display area in the video stream playing interface of the preset application, the method further comprises:
displaying a second preset interaction control in the video stream playing interface; and
wherein during the process of playing the second video in the video stream playing interface, the method further comprises:
hiding the second preset interaction control.

9. The method according to claim 1, further comprising at least one of the following:
during the process of changing the display area for the second video from the first display area to the second display area, the preset prompt information appearing in the video stream playing interface in a preset gradually changing manner; or
after changing the display area for the second video from the first display area to the second display area, the preset prompt information appearing in the video stream playing interface in a preset gradually changing manner.

10. The method according to claim 1, wherein the preset reminding condition comprises at least one of the following:
detecting that a duration of the current user watching the video stream by using the preset application is greater than a preset duration threshold;
detecting that a number of videos in the video stream watched by the current user by using the preset application is greater than a preset number threshold;
detecting that a value of a preset indicator of the current user reaches a preset indicator threshold, wherein the preset indicator is used for representing a fatigue degree of the user; or
detecting that a current time reaches a set time.

11. The method according to claim 1, further comprising at least one of the following:
during the process of changing the display area for the second video from the first display area to the second display area, displaying a dynamic background pattern outside the second display area in the video stream playing interface; or
after changing the display area for the second video from the first display area to the second display area, displaying a dynamic background pattern outside the second display area in the video stream playing interface,
wherein the dynamic background pattern is changed according to a change in video content in the second video.

12. An electronic device, comprising a memory, a processor, and a computer program stored on the memory and executable on the processor, wherein the processor, when executing the computer program, implements the following display control operations:
playing a first video in a first display area in a video stream playing interface of a preset application;
in response to receiving a switching instruction and a preset reminding condition being met, switching to play a second video in the first display area, wherein a display area for the second video is changed from the first display area to a second display area during a playing process, and a size of the second display area is smaller than a size of the first display area;
displaying preset prompt information outside the second display area in the video stream playing interface, wherein the preset prompt information is used for reminding a current user to pause watching the video stream played in the video stream playing interface;
in response to receiving the switching instruction and the preset reminding condition being met, starting a countdown;
continuing playing the second video without switching to play a third video based on detecting a determination result that the countdown has not ended;
in response to receiving a first preset operation for the second video in the second display area, based on the determination result that the countdown has not ended, changing the display area for the second video from the second display area to the first display area, and continuing playing the second video in the first display area; and
after changing the display area for the second video from the second display area to the first display area, displaying a preset interaction control in the first display area, wherein the preset interaction control is used for performing a preset operation on the second video, and the preset operation comprises at least one of a downloading operation or a sharing operation.

13. The electronic device according to claim 12, wherein, after the display area for the second video is changed from the first display area to the second display area during the playing process, the processor, when executing the computer program, further implements the following operation:
continuing playing the second video in the second display area.

14. A non-transitory computer-readable storage medium, having a computer program stored thereon, wherein the computer program, when executed by a processor, implements the following display control operations:
playing a first video in a first display area in a video stream playing interface of a preset application;
in response to receiving a switching instruction and a preset reminding condition being met, switching to play a second video in the first display area, wherein a display area for the second video is changed from the first display area to a second display area during a playing process, and a size of the second display area is smaller than a size of the first display area;
displaying preset prompt information outside the second display area in the video stream playing interface, wherein the preset prompt information is used for reminding a current user to pause watching the video stream played in the video stream playing interface;
in response to receiving the switching instruction and the preset reminding condition being met, starting a countdown;

continuing playing the second video without switching to play a third video based on detecting a determination result that the countdown has not ended;

in response to receiving a first preset operation for the second video in the second display area, based on the determination result that the countdown has not ended, changing the display area for the second video from the second display area to the first display area, and continuing playing the second video in the first display area; and after changing the display area for the second video from the second display area to the first display area, displaying a preset interaction control in the first display area, wherein the preset interaction control is used for performing a preset operation on the second video, and the preset operation comprises at least one of a downloading operation or a sharing operation.

15. The non-transitory computer-readable storage medium according to claim 14, wherein, after the display area for the second video is changed from the first display area to the second display area during the playing process, the computer program, when executed by the processor, further implements the following operation:

continuing playing the second video in the second display area.

* * * * *